United States Patent [19]

Kishida

[11] Patent Number: 5,225,901
[45] Date of Patent: Jul. 6, 1993

[54] APPARATUS AND METHOD FOR CONVERTING AND DISPLAYING R, G, AND B SIGNALS FROM A PREPRESS SCANNER

[75] Inventor: Yoshihiro Kishida, Kyoto, Japan

[73] Assignee: Dainippon Screen Mfg. Co., Ltd., Kyoto, Japan

[21] Appl. No.: 873,432

[22] Filed: Apr. 23, 1992

[30] Foreign Application Priority Data

May 14, 1991 [JP] Japan ................................. 3-107979

[51] Int. Cl.$^5$ ............................................. H04N 1/46
[52] U.S. Cl. ..................................... 358/80; 358/448; 358/75
[58] Field of Search ................... 358/75, 80, 401, 400, 358/448, 443, 447, 452, 76, 406

[56] References Cited

U.S. PATENT DOCUMENTS

| 4,668,980 | 5/1987 | Stansfield et al. | 358/80 |
| 4,992,864 | 2/1991 | Akiyama | 358/80 |
| 5,073,818 | 12/1991 | Iida | 358/80 |
| 5,081,527 | 1/1992 | Naito | 358/80 |
| 5,103,319 | 4/1992 | Ito et al. | 358/406 |

*Primary Examiner*—Edward L. Coles, Sr.
*Assistant Examiner*—Jerome Grant, II
*Attorney, Agent, or Firm*—Lowe, Price, LeBlanc & Becker

[57] ABSTRACT

The present invention provides an image processing apparatus. The image processing apparatus is capable of determining a color-separation condition suitable for any kind of prepress scanner and comprises an image reading unit. A converting condition storing device stores data relating to at least one converting condition for converting first R.G.B. signals obtained through reading by the image reading unit into second R.G.B. signals which are substantially equivalent to signals which would be obtained through reading by a different image reading unit within one kind of prepress scanner. A first converting device changes the first R.G.B. signals into second R.G.B. signals in accordance with the converting condition data. A second converting device changes the second R.G.B. signals into C.M.Y. or C.M.Y.K. signals in accordance with color-separation condition data. A color-separation condition correcting device corrects the color-separation condition, and a visual image display produces a visual image from the C.M.Y. or C.M.Y.K. signals obtained by the second converting device during each color-separation condition correcting step until a final correction is achieved.

10 Claims, 4 Drawing Sheets

APPARATUS AND METHOD FOR CONVERTING AND DISPLAYING R, G, AND B SIGNALS FROM A PREPRESS SCANNER

BACKGROUND OF THE INVENTION

(1) Field of the Invention

The present invention relates to an image processing apparatus, more particularly, to an image processing apparatus such as a set-up apparatus capable of determining a color-separation condition, or a set-up condition to be set into a prepress scanner utilized for producing a color separation with high resolution and the method thereof.

(2) Description of the Related Art

Generally, a prepress company receives an original from their client(designers and publishers, for example) and produces a color separation after color separation work, then delivers printed products to the client. In color-separation work, the original is read in R.G.B. (Red, Green, Blue) signals; and the R.G.B. signals are converted into C.M.Y. (Cyan, Magenta, Yellow) signals from which the color separation is produced.

The color separation is produced to the instructions from the client on the colors and tones for the reproduction of the original. A scanner operator at the prepress company sets a set-up condition in order to produce the color separation to meet the client's requirements into a prepress scanner by using his/her skills or the like.

However, the client's intention may not be fully understood by the scanner operator, or the client and the scanner operator may misunderstand each other sometimes. In such a case, color-separation work has to be repeated many times until the desired color separation is obtained, which presents a problem that time and labor are consumed uneconomically. Particularly, such a problem happens frequently when the client requests an extreme color correction or tone correction for a special effect, or when the client can not give the scanner operator instructions on corrections in detail.

At the prepress company, the set-up condition to be set in the prepress scanner is determined by the prepress scanner or by a set-up apparatus. In the former case, it takes considerable time to determine the set-up condition to obtain the desired color separation during which the color separation producing section of the prepress scanner remains idle that is, the prepress scanner is utilized inefficiently. Whereas in the latter case, determination of the set-up condition and producing of the color separation are carried out parallel, and as a result, work efficiency is easily enhanced.

In addition, the set-up apparatus is rather inexpensive since it is equipped with minimum resolution necessary to determine the set-up condition and without a function for producing the color separation.

It is assumed that when the client determines the set-up condition to obtain the desired color separation by the set-up apparatus in their possession, the desired color separation is efficiently obtained.

However, the idea is not practical because each single kind of set-up apparatus can be applied only to a particular kind of prepress scanner with identical sensitivity characteristics and spectral characteristics. In other words, the client has to maintain several kinds of setup apparatuses, i.e., one for each kind of prepress scanner maintained by several prepress companies.

It should be noted that the conventional set-up apparatus does not retain high availability in obtaining the desired color separation efficiently.

SUMMARY OF THE INVENTION

The present invention has a primary object to provide an image processing apparatus such as a set-up apparatus with an input scanner which is capable of determining a color separation condition' suitable for any kind of prepress scanner equipped with another input scanner.

The above object is fulfilled by an image processing apparatus which includes an input scanner and a converting condition storing device. The converting condition storing device stores data relating to at least one converting condition for converting first R.G.B. signals obtained through reading by the input scanner into second R.G.B. signals which are substantially equivalent to signals obtained through reading by another input scanner which is present in an apparatus other than the image processing apparatus. A first converting device changes the first R.G.B. signals into second R.G.B. signals in accordance with the stored data relating to a converting condition. A second converting device changes the second R.G.B. signals into C.M.Y. signals or C.M.Y.K. (Cyan, Magenta, Yellow, Black) signals in accordance with color-separation condition data. A color-separation condition correcting device corrects the color-separation condition, and a visual display device produces a visual image based on the (or C.M.Y.K.) signals obtained by the second converting device during each color-separation condition correcting step until a final correction is achieved.

With the above construction, the first R.G.B. signals obtained through reading by the input scanner are converted into the second R.G.B. signals which are substantially equivalent to the signals obtained through reading by another input scanner by the first converting device in accordance with the converting condition data in the converting condition storing device. Then the second R.G.B. signals are converted into C.M.Y. signals in accordance with the color-separation condition data by the second converting device. As a result, the C.M.Y. signals or the like are equivalent to C.M.Y. signals which would be produced by conversion from R.G.B. signals to C.M.Y. signals through reading by another input scanner. Therefore, in summary, a single setup apparatus can determine a color-separation condition suitable for any kind of prepress scanner by installing the characteristics converting device even when the input scanner equipped with the set-up apparatus and another input scanner equipped with the prepress scanner are different in characteristics.

Further, the present invention has another object for providing an image processing method to determine a set-up condition suitable for any kind of prepress scanner by a single set-up apparatus.

The above object is fulfilled by the image processing method which includes a step of reading an original by an input scanner and a first converting step. The first converting step changes the first R.G.B. signals obtained through reading by input scanner into second R.G.B. signals which are substantially equivalent to signals which would be obtained through reading by another input scanner equipped with an apparatus other than the set-up apparatus in accordance with a converting condition data for converting the first R.G.B. signals into the second R.G.B. signals. A second converting step changes the second R.G.B. signals into C.M.Y. signals or C.M.Y.K. signals in accordance with a color-separation condition data. Then color-separation condition is collected, and a visual image is produced from the C.M.Y. signals obtained in the second converting step during each color-separation condition correcting step until a final correction is achieved.

With the above steps, the first R.G.B. signals obtained through reading by the input scanner are converted into the second R.G.B. signals which are substantially equivalent to the signals obtained through reading by another input scanner in accordance with the converting condition data in the first converting step. Since the second R.G.B. signals are converted into the C.M.Y. signals or the like in accordance with the color-separation condition data in the second converting step, the C.M.Y. signals are equivalent to C.M.Y. signals converted from R.G.B. signals obtained through reading by another input scanner. Therefore, in summary, a single set-up apparatus for carrying out the above steps can determine a color-separation condition suitable for any kind of prepress scanner by installing the characteristics converting device even when the input scanner equipped with the set-up apparatus and another input scanner equipped with the prepress scanner are different in characteristics.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENT

In the embodiment, an image processing apparatus of the present invention is referred to as a "set-up" apparatus.

Figure 1:
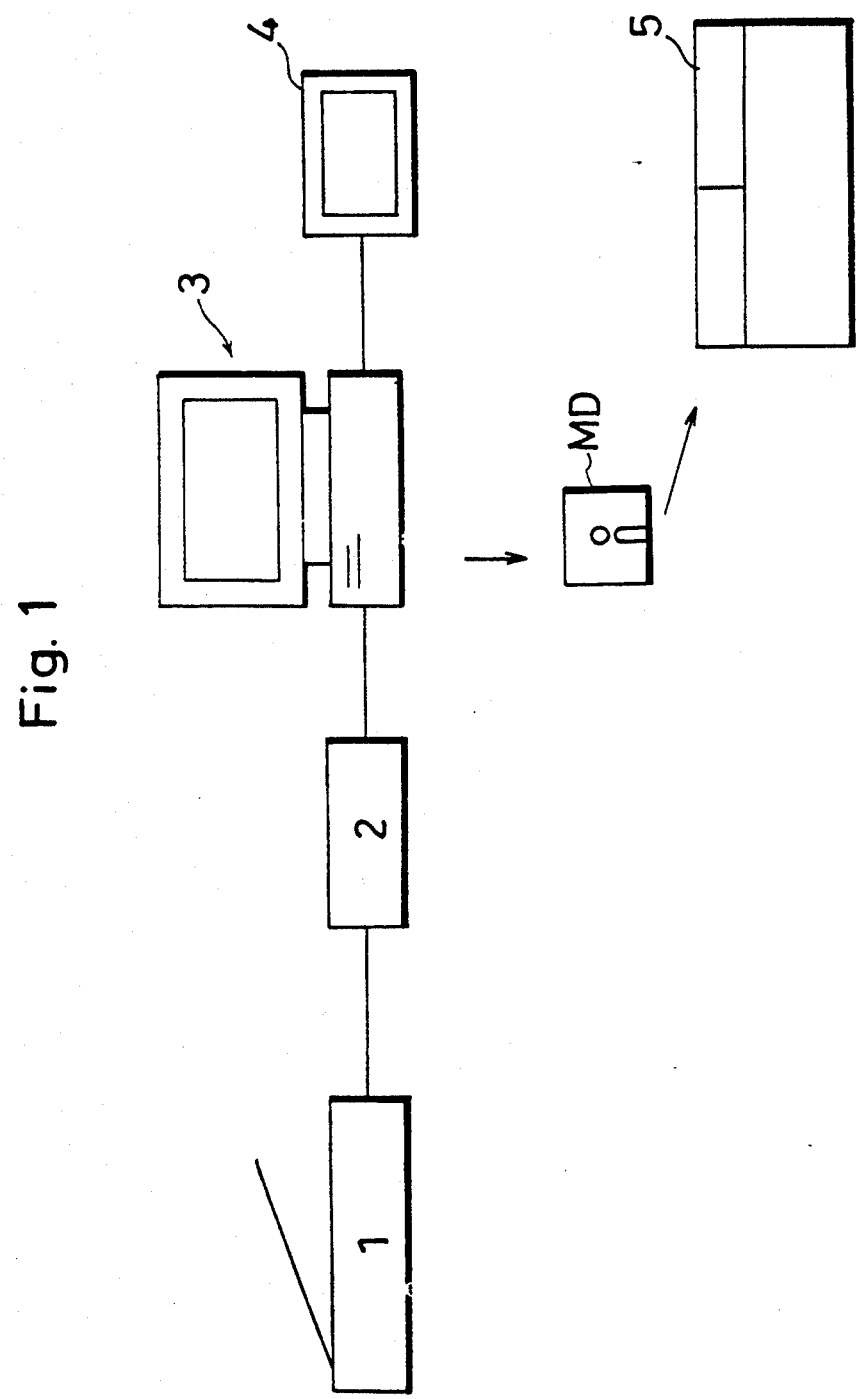
FIG. 1 is a schematic view of the embodiment of the present invention.

FIG. 1 is a schematic view of the set-up apparatus.

The set-up apparatus can be installed in the office of an orderer, or a client for a prepress company and a printing company.

The set-up apparatus comprises an input scanner 1, a processing unit 2, a personal computer 3 and a display 4. The input scanner 1 retains low resolution for an image and the processing unit 2 processes the image obtained through reading by the input scanner 1. The personal computer 3 determines a set-up condition, or a color-separation condition, based on the processed image, which is stored into a magnetic disk MD or similar data recording media, and the image is displayed on the display 4 in accordance with the set-up condition.

The magnetic disk MD in the personal computer 3 can be removed therefrom and set in a prepress scanner 5 in the possession of the prepress company. The prepress scanner 5 reads the set-up condition stored in the magnetic disk MD and sets up the prepress scanner accordingly. There is only one prepress scanner 5 in FIG. 1, however, there actually are plural kinds of prepress scanners maintained by one or several prepress companies.

Figure 2:
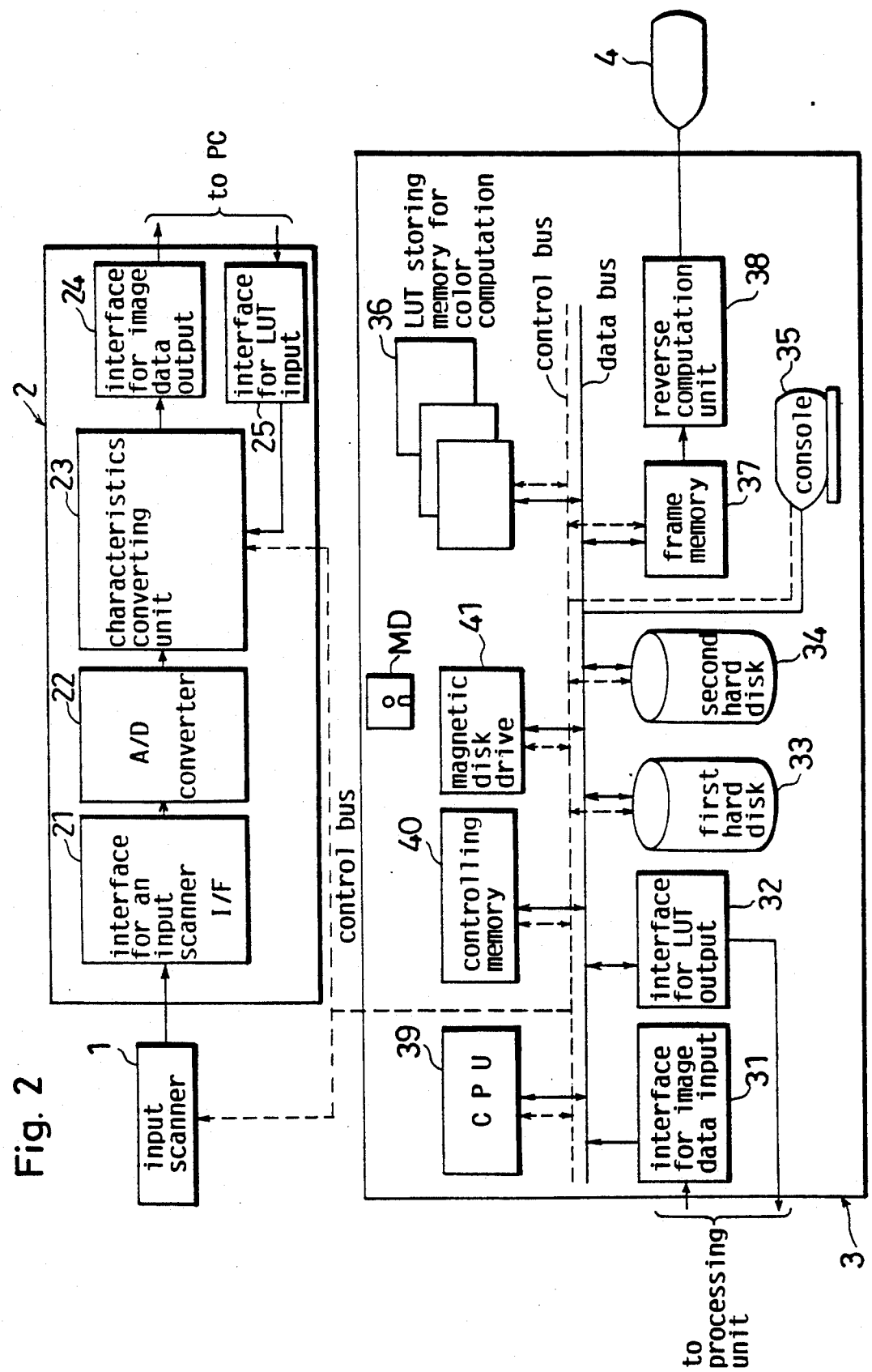
FIG. 2 is a block diagram of the embodiment of the present invention.

The detailed construction of the set-up apparatus is described hereunder by referring to FIG. 2.

(Construction of the input scanner 1)

The input scanner 1 utilized in the embodiment is a color scanner of a flat-bed type with low resolution. The input scanner reads the original in three colors; red(R), green(G), blue(B), each of which is outputted as analog signals of R.G.B. respectively.

(Construction of the processing unit 2)

The processing unit 2 comprises an interface 21 for an input scanner, an A/D (Analog/Digital) converter 22, a characteristics converting unit 23, an interface 24 for image data output and an interface 25 for look-up table input.

The A/D converter 22 converts the analog signals obtained through reading by the input scanner 1 into digital R.G.B. signals (hereinafter referred to the first R.G.B. signals).

The characteristics converting unit 23 converts the first R.G.B. signals into signals (hereinafter referred to the second R.G.B. signals) which are substantially equivalent to R.G.B. signals which would be obtained through reading by another input scanner (not shown) of the prepress scanner 5.

More precisely, the signals are converted in accordance with a look-up table for the characteristics conversion data suitable for the kind of prepress scanner actually used by the prepress company. The look-up table for characteristics conversion comprises a group of data as a converting condition showing correlation between the first R.G.B. signals and the second R.G.B. signals. The first R.G.B. signals are dependent on the characteristics of the input scanner 1 equipped with the set-up apparatus, while the second R.G.B. signals are dependent on the characteristics of the input scanner of the prepress scanner 5. The look-up table data for characteristics conversion is read out by a second hard disk 34 (which will be described later), and stored in a memory unit such as RAM (Random Access Memory) or the like (not shown).

The interface 24 for look-up table input is equipped with an input port, by which the look-up table for characteristics conversion is inputted into the characteristics converting unit 23. The interface 24 for image data output is equipped with an output port and outputs therefrom the second R.G.B. signals which have been converted into the ones suitable for the characteristics of the prepress scanner by the characteristics converting unit 23.

(The construction of the Personal Computer 3)

The personal computer 3 comprises an interface 31 for image data input, an interface 32 for look-up table output, a first hard disk 33, a second hard disk 34, a console 35, a look-up table storing memory 36 for color computation, a frame memory 37, a reverse computation unit 38, a CPU (Central Processing Unit) 39, a controlling memory 40 and a magnetic disk drive 41.

The interface 31 for image data input is equipped with an input port, by which the image data from the processing unit 2 are inputted thereinto. The interface 32 for look-up table output is equipped with an output port, by which the look-up table for characteristics conversion read out from the second hard disk 34 is outputted to the processing unit 2.

The first hard disk 33 stores the image data inputted from the processing unit 2 through the interface 31 for image data input.

The second hard disk 34 has been previously loaded with the look-up tables for characteristics conversion, a look-up table for color computation, and information of recording formats for the magnetic disk MD.

Each of the look-up tables for characteristics conversion stored in the second hard disk 34 is utilized at the above characteristics converting unit 23. Each of them slightly differs because each kind of the applicable prepress scanners differs in characteristics. The correlation between the look-up tables for characteristics conversion and the prepress scanner is controlled by the CPU. The kind of the prepress scanner is designated by the console 35, then a corresponding look-up table for characteristics conversion is retrieved from the second hard disk 34 and transmitted to the processing unit 2.

The look-up table for color computation stored in the second hard disk 34 is a group of data showing the correlation between R.G.B. signals and C.M.Y.K. signals in the standard set-up condition.

Information of the recording formats for the magnetic disk MD stored in the second hard disk 34 is about a physical format readable by the utilized prepress scanner, an array order of the data, and a data form or the like.

The apparatus is designed to store the image data and each look-up table into the first and the second hard disks 33 and 34 so that the data with large volume can be processed at a high speed. However, it goes without saying that well-known memories can replace the hard disks.

The look-up table storing memory 36 for color computation stores the look-up table for color computation read out from the second hard disk 34, or a modified look-up table for color computation in accordance with the set-up condition designated by the scanner operator. The image data expressed in the second R.G.B. signals are sent from the unit processing unit 2 and stored in the first hard disk 33, which are then converted into C.M.Y.K. signals in accordance with the look-up table.

The frame memory 37 stores the C.M.Y.K. signals for one frame obtained by the above procedure.

The reverse computation unit 38 is equipped with a look-up table for reversely converting the C.M.Y.K. (C.M.Y.) signals from the frame memory 37 into other R.G.B. signals (hereinafter referred to as the third R.G.B. signals) in order to display an image based on the third R.G.B. signals on the display 4 so that the set-up condition can be confirmed visually. The console 35 comprises a key-board and a character display, by which a kind or a reference numbers of the utilized prepress scanners is inputted. Moreover, the set-up condition such as high-light density, shadow density, tones, color correction, UCA (Under Color Add), UCR (Under Color Removal) as a parameter for the color computation setting as well as a read-out start instruction and a setting-end instruction for the set-up condition are inputted.

The magnetic disk drive 41 stores data representing the set-up condition into the magnetic disk MD when the desired image is displayed on the display 4 and the setting-end instruction is outputted by the console 35.

The CPU 39 controls the processing unit 2 and the personal computer 3 based on the control data from the controlling memory 40, the controlling method thereof will be described later.

(Display 4)

The display 4 is a color graphic display for displaying the image based on the third R.G.B. signals which have been converted from the C.M.Y.K. (C.M.Y.) signals stored in the frame memory 37 by the reverse computation unit 38.

(Explanation of the image processing operation)

Figure 3:
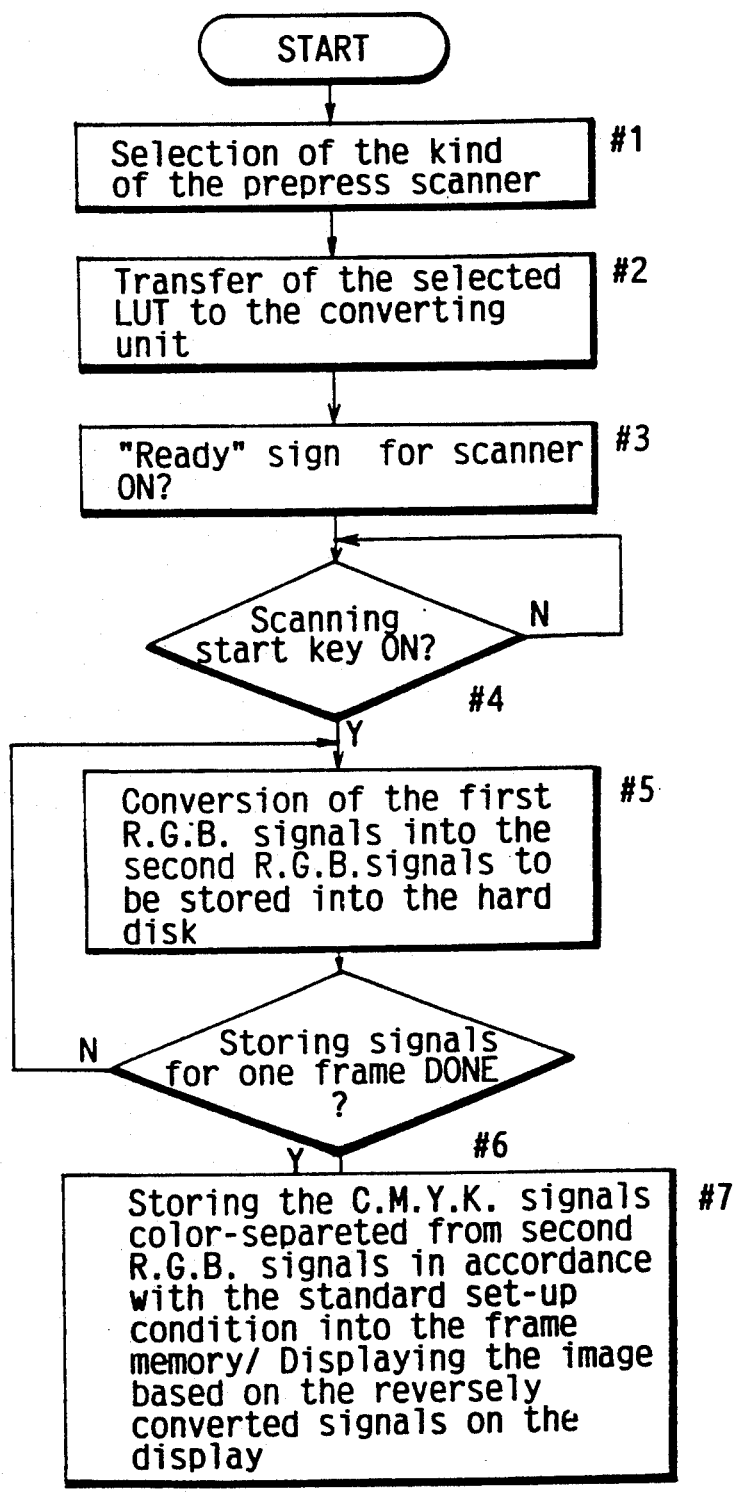
FIGS. 3 and 4 are a flow charts showing operation of the system of FIG. 2.
Figure 4:
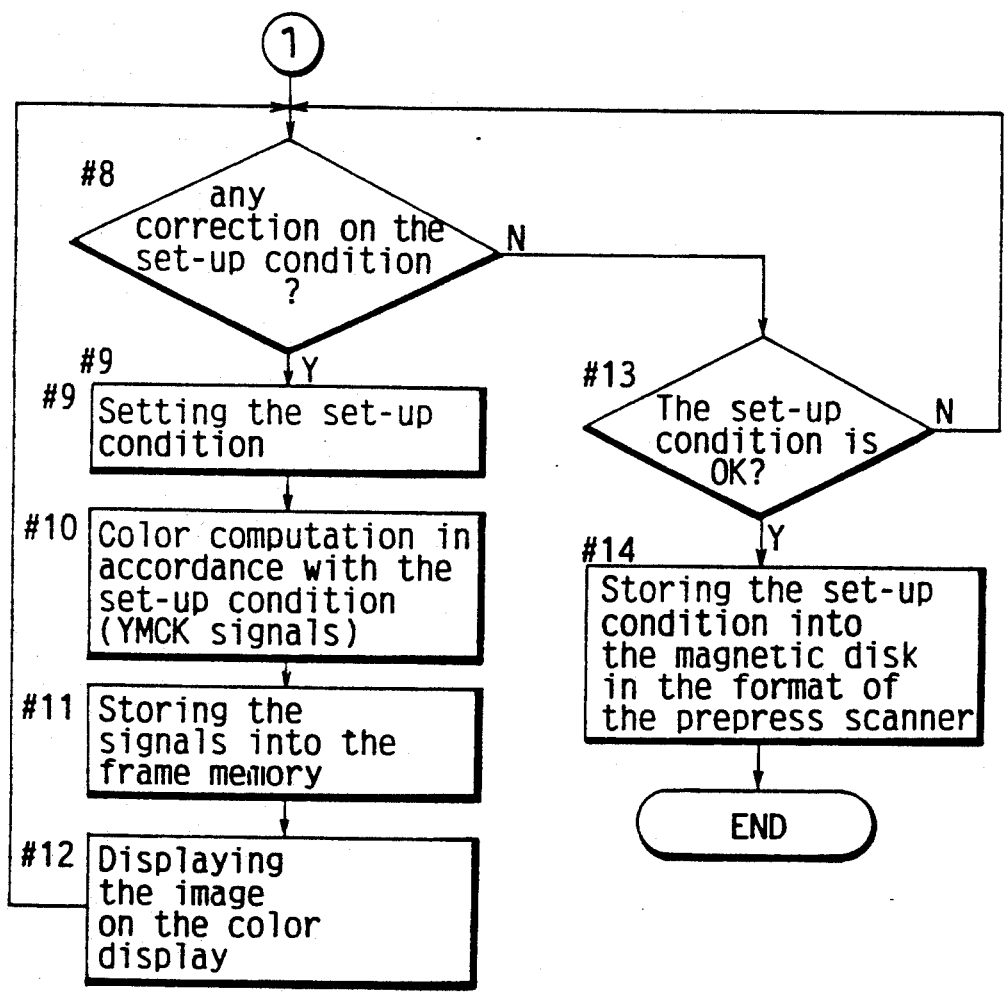

The operation of the set-up apparatus is described hereunder with referring to the FIGS. 3 and 4.

(#1) The original is set in the input scanner 1 by the operator, the kind of the prepress scanner utilized for producing the color separation is selected by an operator using the console 35.

(#2) The look-up table (LUT) for characteristic conversion corresponding to the designated prepress scanner is read out from the second hard disk 34 and transferred to the characteristics converting unit 23 to be set therein.

(#3) A "Ready" sign for the scanner input appears on the display of the console 35.

(#4) The operator sets the scanning start key of the console 35 when he/she reads the "Ready" sign, then the input scanner 1 starts reading by scanning every line of the original set therein.

(#5) The read out signals (the first R.G.B. signals) are converted into the second R.G.B. signals suitable for the characteristics of the prepress scanner by the characteristics converting unit 23 using the characteristic conversion data of the table retrieved from the first hard disk 33.

(#6) The above processes for one frame is completed.

(#7) The look-up table for the color computation is transmitted to the look-up table storage memory 36 for the color computation from the second hard disk 34. On the other hand, the second R.G.B. signals for one frame are read out from the first hard disk 33. They are converted into the C.M.Y.K. (C.M.Y.) signals based on the standard set-up condition in accordance with the look-up table for the color computation and stored in the frame memory 37. At the same time, the image is displayed on the display 4 after the C.M.Y.K. (C.M.Y.) signals are reversely converted into the third R.G.B. signals by the reverse computation unit 38.

(#8) When the image on the display 4 is not the desired one, a correction of the set-up condition such as high-light density, shadow density, tones, color correction, UCA, UCR is inputted.

(#9) The new set-up condition is set in accordance with the correction.

(#10) According to the new set-up condition, the second R.G.B. signals stored in the first hard disk 33 are again done with the color computation.

(#11) The C.M.Y.K. signals after the color computation are written into the frame memory 37.

(#12) The corrected image is displayed on the display 4 after being reversely converted by the reverse computation unit 38. The operator checks the display visually and the correction of the set-up condition is repeated until the desired image is obtained.

(#13) The exit key of the console 35 is operated when the desired image is obtained.

(#14) Data representing the set-up condition data right before the operation of the exit key is stored into the magnetic disk MD set in the magnetic disk drive 41 in accordance with the recording format suitable for the kind of the utilized prepress scanner. The steps 1 through 14 are considered to be the one series of the process of the image processing apparatus.

The magnetic disk MD storing the set-up condition is removed from the magnetic disk drive 41 and delivered to the prepress company together with the original. The prepress company only sets the magnetic disk MD into the prepress scanner designated from the client, for example, the one with the resolution of 600DPI, in order to produce the color separation with high resolution in accordance with the set-up condition data.

In summary, first R.G.B. signals of the original obtained through reading by the input scanner 1 are converted into second R.G.B. signals suitable for the characteristic of the input scanner of utilized prepress scanner. Subsequently, the second R.G.B. signals are converted into C.M.Y.K. signals based on the color computation in accordance with the set-up condition. Moreover the visual image is displayed based on the C.M.Y.K. signals. The correction of the set-up condition is repeated until the desired image is obtained. Therefore, with the above image processing apparatus, the set-up condition suitable for the characteristics of the prepress scanner can be determined.

More simply, the client stores the desired set-up condition data suitable for the prepress scanner by the set-up apparatus in their possession into the recording media and deliver the recording media with the original to the prepress company. The prepress company only sets the recording media into their prepress scanner in order to produce the color separation which meets the client's requirements.

Consequently, both the client and the prepress company are able to obtain the desired color separation without spending enormous time uneconomically. It should be noted that the availability of the set-up apparatus of the present invention is extremely high.

In the above embodiment, although the original image read by the input scanner is displayed on the display 4, it can be outputted by a color printer. In this case, the reverse computation unit 38 is not necessary.

In the above embodiment, the look-up table for the color computation converts the R.G.B. signals into the C.M.Y.K. signals, however, it can be converted into C.M.Y. signals excluding K.

Although the set-up condition data is set into the prepress scanner by the magnetic disk MD, anything capable of transmitting the set-up condition data or the like from the set-up apparatus to the prepress scanner such as IC cards can replace the magnetic disk MD.

Since the set-up apparatus is in the possession of the client, the client delivers the magnetic disk storing the set-up condition together with the original to the prepress company in the embodiment, however, the set-up apparatus can be maintained by the prepress company.

In the embodiment, the present invention was applied to the set-up apparatus, however, it may be applied to the prepress scanner when the characteristics of these two apparatuses differ. More precisely, the characteristics converting unit may be installed in the prepress scanner, by which signals of the originals are converted into the ones suitable for the characteristics of the set-up apparatus.

Although the present invention has been fully described by way of examples with reference to the accompanying drawings. it is to be noted that various changes and modifications will be apparent to those skilled in the art. Therefore, unless otherwise such changes and modifications depart from the scope of the present invention, they should be construed as being included therein.

What is claimed is:

1. An image processing apparatus comprising:
   an image reading unit;
   converting condition data storing means for storing converting condition data corresponding to a plurality of other image reading units, wherein each of the converting condition data corresponding to an other image reading unit comprises data relating to at least one converting condition for converting first R.G.B. signals obtained through reading by the image reading unit included in said image processing apparatus into second R.G.B. signals which are substantially equivalent to signals which would be obtained through reading by an image reading unit which is different from the image reading unit included in said image processing apparatus;
   selecting means for selecting one converting condition data corresponding to one other image reading unit out of the converting condition data corresponding to a plurality of other image reading units;
   first converting means for converting the first R.G.B. signals into second R.G.B. signals in accordance with the one selected converting condition data;
   second converting means for converting the second R.G.B. signals into color separation signals, comprising at least one of C.M.Y. signals and C.M.Y.K. signals, in accordance with color-separation condition data;
   color-separation condition correcting means for correcting the color-separation condition of said color-separation signals; and
   visual image producing means for producing a visual image from the color separation signals obtained by the second converting means during color-separation condition correction until a final correction is achieved.

2. An image processing apparatus of claim 1, wherein the one other image reading unit is an image reading unit equipped with a prepress scanner utilized for producing a color separation.

3. An image processing apparatus of claim 1, wherein the plurality of the other image reading units are equipped with a plurality of prepress scanners.

4. An image processing apparatus of claim 1, wherein the visual image producing means includes:
   converting means for converting the C.M.Y. signals into other R.G.B. signals for display; and
   a color graphic display for displaying the image in accordance with the other R.G.B. signals for display.

5. An image processing apparatus of claim 1, wherein the visual image producing means includes a color printer for printing out the image based on the C.M.Y. signals.

6. An image processing apparatus of claim 1, further comprising:
   color-separation condition storing means for storing data regarding the corrected color-separation condition on a recording media removable from the image processing apparatus.

7. An image processing apparatus of claim 6, wherein the recording media comprises a magnetic recording media.

8. An image processing apparatus comprising:

an image reading unit;

converting condition data storing means for storing a plurality of converting condition data suitable for a plurality of kinds of prepress scanners utilized for producing a color separation, wherein each converting condition data is for converting first R.G.B. signals obtained through reading by said image reading unit into second R.G.B. signals which are substantially equivalent to signals which would be obtained through reading by an image reading unit which is part of one of the plurality of prepress scanners;

selecting means for selecting one converting condition data out of the plurality of converting condition data;

first converting means for converting the first R.G.B. signals into second R.G.B. signals in accordance with the one selected converting condition data;

second converting means for converting the second R.G.B. signals into color separation signals, comprising at least one of C.M.Y. signals and C.M.Y.K. signals, in accordance with color-separation condition data;

color-separation condition correcting means for correcting the color-separation condition of said color-separation signals;

color-separation condition storing means for storing data regarding the corrected color-separation condition on a storing media removable from the image processing apparatus; and visual image producing means for producing a visual image from the color-separation signals obtained by the second converting means during color-separation condition correction until a final correction is achieved.

9. An image processing method comprising:

reading an original image by an image reading unit;

selecting one converting condition data out of data relating to a plurality of converting conditions suitable for a plurality of kinds of prepress scanners utilized for producing a color separation, wherein each converting condition data is for converting first R.G.B. signals obtained through reading by said image reading unit into second R.G.B. signals which are substantially equivalent to signals which would be obtained through reading by an image reading unit of one of the plurality of prepress scanners;

in a first converting step, converting the first R.G.B. signals into second R.G.B. signals in accordance with the one selected converting condition data;

in a second converting step, converting the second R.G.B. signals into color separation signals, comprising at least one of C.M.Y. signals and C.M.Y.K. signals, in accordance with color-separation condition data;

correcting a color-separation condition of said color-separation signals;

storing data regarding the corrected color-separation condition on a recording media removable from the image processing apparatus; and producing a visual image from the color-separation signals obtained by the second converting means during color-separation condition correction until a final correction is achieved.

10. An image processing apparatus comprising:

an image reading unit of a first type;

conversion data storage means for storing conversion data corresponding to a plurality of other types of image reading units different from the first type, the conversion data for each of the plurality of other types of image reading units comprising data relating to at least one conversion condition;

means for selecting conversion data corresponding to one of the plurality of other types of image reading units;

means for converting a first set of color image signals obtained through reading an image by said image reading unit into a second set of color image signals substantially equivalent to signals which would have been obtained through reading the image by the selected other type of image reading unit in accordance with the selected conversion data; and means for obtaining corrected color-separation signals from the second set of color image signals.

* * * * *